(12) United States Patent
Ugliano et al.

(10) Patent No.: US 10,485,063 B2
(45) Date of Patent: Nov. 19, 2019

(54) POWER SUPPLY CIRCUIT, AND RELATED LIGHTING SYSTEM AND METHOD FOR OPERATING A POWER SUPPLY CIRCUIT

(71) Applicant: OSRAM GmbH, Munich (DE)

(72) Inventors: Giaime Ugliano, Martellago (IT); Maurizio Minuti, Belluno (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/111,264

(22) Filed: Aug. 24, 2018

(65) Prior Publication Data

US 2019/0069359 A1 Feb. 28, 2019

(30) Foreign Application Priority Data

Aug. 28, 2017 (IT) .......................... 102017000096515

(51) Int. Cl.
*H05B 33/08* (2006.01)
*H02M 3/156* (2006.01)

(52) U.S. Cl.
CPC ........ *H05B 33/0815* (2013.01); *H02M 3/156* (2013.01); *H05B 33/083* (2013.01); *H05B 33/0854* (2013.01); *H05B 33/0866* (2013.01)

(58) Field of Classification Search
CPC .............. H05B 33/0815; H05B 33/083; H05B 33/0866; H05B 33/0854; H02M 3/156
See application file for complete search history.

(56) References Cited

U.S. PATENT DOCUMENTS

| 7,675,245 | B2* | 3/2010 | Szczeszynski | ............ G05F 1/46 |
| | | | | 315/185 S |
| 7,999,487 | B2* | 8/2011 | Szczeszynski | ..... H05B 33/0815 |
| | | | | 315/246 |
| 9,007,000 | B2* | 4/2015 | Szczeszynski | ..... H05B 33/0815 |
| | | | | 315/308 |
| 9,538,601 | B1* | 1/2017 | Mangtani | ........... H05B 33/0854 |

(Continued)

FOREIGN PATENT DOCUMENTS

WO 2010128845 A2 11/2010

OTHER PUBLICATIONS

Italian Search Report based on application No. 102017000096515 (7 pages) dated May 4, 2018 (for reference purpose only).

*Primary Examiner* — Dedei K Hammond
*Assistant Examiner* — Raymond R Chai
(74) *Attorney, Agent, or Firm* — Viering Jentschura & Partner MBB

(57) ABSTRACT

A power-supply circuit may include a current generator configured to generate a regulated current. The current generator may include a switching stage, a current sensor, and a regulation circuit configured for driving the switching stage as a function of a feedback signal supplied by the current sensor.
The power-supply circuit may further include an electronic switch configured to shortcircuit selectively the output of the current generator as a function of a drive signal, and a control circuit configured to generate the drive signal for opening or closing selectively the electronic switch.
In particular, the current generator is configured to activate or de-activate generation of the regulated current as a function of an enable signal, and the control circuit is configured to generate the enable signal and the drive signal in such a way as to synchronize the ripple in the regulated current with the further drive signal.

8 Claims, 6 Drawing Sheets

(56) References Cited

U.S. PATENT DOCUMENTS

| | | | | |
|---|---|---|---|---|
| 9,825,528 | B2* | 11/2017 | Lee | H02J 1/00 |
| 10,278,242 | B2* | 4/2019 | Wang | H05B 33/0815 |
| 2013/0038234 | A1* | 2/2013 | Van Der Veen | H05B 33/0815 |
| | | | | 315/224 |
| 2015/0061528 | A1* | 3/2015 | Raval | H05B 33/0827 |
| | | | | 315/210 |
| 2015/0244353 | A1* | 8/2015 | Humphrey | H03K 3/017 |
| | | | | 327/175 |
| 2018/0339642 | A1* | 11/2018 | Kikuchi | B60Q 1/04 |

\* cited by examiner

US 10,485,063 B2

POWER SUPPLY CIRCUIT, AND RELATED LIGHTING SYSTEM AND METHOD FOR OPERATING A POWER SUPPLY CIRCUIT

CROSS REFERENCE TO RELATED APPLICATION

This present application claims priority to Italian Patent Application No. 102017000096515 filed on Aug. 28, 2017; which is incorporated by reference herein in its entirety and for all purposes.

FIELD OF THE INVENTION

The present disclosure relates to power-supply circuits, in particular for lighting systems.

TECHNOLOGICAL BACKGROUND

FIG. 1 shows a typical lighting system.

A lighting system comprises a power-supply circuit 10 and at least one lighting module 20 comprising one or more light sources, such as at least one LED (Light-Emitting Diode) or other solid-state lighting means, such as laser diodes.

For example, the power-supply circuit 10 may comprise a current generator 12; namely, the power-supply circuit 10 receives at input via two terminals 100a and 100b a power-supply signal $V_{in}$ (for example, from the power mains supply or a battery) and supplies a regulated current $i_{out}$ via a positive terminal 102a and a negative terminal 102b.

In a complementary way, the lighting module 20 comprises a positive input terminal 200a and a negative input terminal 200b for connection to the terminals 102a and 102b of the power-supply circuit 10. For example, the lighting module 20 may be connected, directly or through a cable, to the power-supply circuit 10. Consequently, the terminal 200a is connected to the terminal 102a, and the terminal 200b is connected to the terminal 102b, and the lighting module 20 hence receives the current $i_{out}$.

As shown in FIG. 2, the lighting module 20 may be a solid-state-light (SSL) module comprising a string of solid-state light sources 22 connected (for instance, directly) in series between the terminals 200a and 200b. For example, FIG. 2 shows three LEDs $L_1$, $L_2$, $L_3$, which are directly connected in series between the terminals 200a and 200b. Consequently, in the example considered, the current $i_{LED}$ that flows through the light sources 22 corresponds to the current $i_{out}$.

Frequently, the current generator 12 is provided with a linear regulator or an electronic switching converter.

For example, FIG. 3 shows a power-supply circuit 10, in which the current generator 12 is implemented with an electronic converter of the buck type, i.e., a step-down converter.

In general, an electronic converter comprises at least:
- two terminals for receiving a DC voltage and two terminals for supplying a current;
- a switching stage 104 comprising one or more electronic switches and one or more inductors (and possibly one or more capacitors);
- a current sensor 106 configured to detect a feedback signal FB representing the current supplied by the switching stage; and
- a regulation circuit 108 configured to generate one or more drive signals for the switching stage 104 as a function of the feedback signal FB.

As explained previously, the power-supply circuit 10 receives at input a voltage $V_{in}$. In the case where this voltage is a DC voltage, for example supplied by a battery, the switching stage 104 can be directly connected to the input terminals 100a and 100b of the electronic converter. Instead, in the case where the voltage $V_{in}$ is an AC voltage, for example supplied by the power mains supply, the switching stage 104 can be connected to the input terminals 100a and 100b of the electronic converter through a rectifier circuit, comprising, for example, a diode bridge and possibly a filtering circuit. Moreover, in general, an electronic converter with power-factor correction (PFC) may be connected between the switching stage 104 and the input terminals 100a and 100b. For example, in FIG. 3, the current generator, in particular the switching stage 104, receives the voltage $V_{in}$ directly.

Likewise, the current supplied by the switching stage may correspond directly to the output current $i_{out}$; i.e., the two output terminals of the switching stage can be directly connected to the terminals 102a and 102b of the power-supply circuit. However, also in this case, there may be provided additional filters for stabilizing the current $i_{out}$. For example, in FIG. 3, the current generator, in particular the output of the switching stage 104, is directly connected to the terminals 102a and 102b.

In the simplest case, the switching stage 104 of a buck converter comprises an electronic switch $SW_1$, such as a field-effect transistor (FET), and an inductor L, which are connected (for example, directly) in series between the terminals 100a and 102a (positive terminals). Instead, the terminal 102b is connected to the terminal 100a (negative terminals). The buck converter further comprises a diode D connected between the terminal 100b and the intermediate point between the electronic switch $SW_1$ and the inductor L. Consequently, in the example considered, the current $i_L$ flowing through the inductor L represents the current supplied by the current generator 12, and hence the current $i_{out}$ supplied through the terminals 102a and 102b.

In the example considered, the regulation circuit 108 hence generates a drive signal $DRV_1$ for the switch $SW_1$.

As shown in FIGS. 4a and 4b, when the switch $SW_1$ is closed (for example, when the drive signal $DRV_1$ is high), the diode D is reversely biased, and the current $i_L$ flowing through the inductor L increases substantially in a linear way. Instead, when the switch $SW_1$ is open (for example, when the drive signal $DRV_1$ is low), the diode D is directly biased and the current $i_L$ flowing through the inductor L decreases in a substantially linear way.

To implement a current generator 12, it would hence be necessary to control the current $i_L$ supplied by the current generator 12. In particular, this can be obtained by controlling the closing or ON time $T_{ON}$ and the opening or OFF time $T_{OFF1}$ of the switch $SW_1$.

For this purpose, the regulation circuit 108 hence detects, by means of the sensor 106, the current $i_L$ supplied by the switching stage 104. For example, FIG. 3 shows a shunt resistor $R_S$, which is connected in series to the output terminals 102a and 102b, for example, between the terminal 102b and the anode of the diode D (i.e., the terminal 100b). Consequently, the resistor $R_S$ represents a current sensor 104 configured to detect the current $i_L$. In general, it is possible to use also other current sensors that are able to detect signals representing the current $i_L$, for example two current sensors configured to detect the current that flows through the switch $SW_1$ and the diode D, respectively.

Consequently, the signal or signals FB representing the current supplied by the switching stage $i_L$ (i.e., the current supplied by the current generator 12) can be supplied to the regulation circuit 108, which drives the switch $SW_1$ with the drive signal $DRV_1$.

For example, solutions are known in which the drive signal $DRV_1$ for the switch $SW_1$ is a signal with pulse-width modulation (PWM), i.e., a signal in which the times $T_{ON}$ and $T_{OFF1}$ are variable but the duration of the switching interval $T_{SW1}=T_{ON}+T_{OFF1}$ is constant. As shown in FIG. 4b, in this case, the regulation circuit 108 may be a PI (Proportional-Integral) regulator or a PID (Proportional-Integral-Derivative) regulator, which increases or decreases the duty cycle $(T_{ON}/T_{SW1})$ of the PWM signal until the mean value of the current $i_L$ corresponds to a required/reference value REF.

As shown in FIG. 4c, also known are solutions in which the regulation circuit 108 comprises a comparison circuit and in which the regulation circuit 108 closes the switch $SW_1$ (by setting the drive signal $DRV_1$ at a first logic level, for example high) when the current $i_L$ drops below a lower threshold $TH_L$ and opens the switch $SW_1$ (by setting the drive signal $DRV_1$ at a second logic level, for example low) when the current $i_L$ exceeds an upper threshold $TH_H$. A comparison circuit of this sort could be implemented also with a single comparator with hysteresis.

In either case, switching of the switch $SW_1$ typically occurs at a frequency of between 20 kHz and 200 kHz. However, whereas the switching frequency is constant for the solution described with reference to FIG. 4b, the switching frequency of the solution described with reference to FIG. 4c is variable, as a function, for example, of the load voltage.

Operation of such an electronic buck converter is well known, which renders a detailed description superfluous herein. Also known are many other electronic switching converters with other topologies (such as boost, buck-boost, flyback, forward, asymmetrical half-bridge converters, etc.), which are able to implement a current generator 12 configured to supply a regulated current $i_L$.

As shown in FIG. 5, in many applications it may be required that the brightness of the light emitted by the lighting module 20 is adjustable (to implement the so-called dimming function) as a function of one or more dimming signals DIMM, i.e., signals indicating the required brightness. For example, the dimming signal DIMM can be received via a terminal 100c of the power-supply circuit 10 and/or be supplied by means of a sensor 112 (such as a light sensor), a user interface (for example, a trimmer) for direct variation of the dimming signal DIMM and/or a receiver (such as an infrared or radio-frequency receiver for receiving a signal transmitted by a remote control).

Also known are solutions in which the current generator 12 is configured for regulating the amplitude of the current $i_L$; i.e., the current $i_L$ is modulated with an amplitude modulation (AM), as a function of a dimming signal DIMM. For example, in a buck converter, the regulation circuit 108 could implement such an amplitude modulation by:
varying the reference value REF of the PI/PID regulator; or
varying the thresholds $TH_H$ and $TH_L$ of the comparison circuit.

Instead, FIG. 5 shows a further technique, in which the power-supply circuit 10 comprises an electronic shunt switch $SW_2$, such as a FET, connected (for example, directly) between the terminals 102a and 102b of the power-supply circuit. The switch $SW_2$ could also be connected (for example, directly) between the terminals 200a and 200b within the lighting module 20. In fact, in general, the switch $SW_2$ is configured for diverting the current $i_L$ generated by the current generator 12 towards the light sources 22 or directly towards the terminal 102b, hence shorting the current generator, i.e., the output of the switching stage 104.

In this case, a control circuit 110 can hence receive at input the dimming signal DIMM and generate a drive signal $DRV_2$ for the switch $SW_2$ as a function of the dimming signal DIMM. In general, the control circuit 110 and the regulation circuit 108 can be implemented also in a single control circuit.

For example, as shown in FIG. 6a, frequently the drive signal $DRV_2$ is a PWM signal, i.e., a signal in which the ON time $T_{ON2}$ and OFF time $T_{OFF2}$ are variable but the duration of the switching interval $T_{SW2}=T_{ON2}+T_{OFF2}$ is constant. Consequently, the control unit 110 can vary the duty cycle $(T_{ON2}/T_{SW2})$ as a function of the dimming signal DIMM. Consequently, as shown in FIGS. 6b and 6c, the light sources 22 of the lighting module 20 are switched on (i.e., the current $i_L$ supplied by the current generator flows through the light sources 22, $i_{LED}=i_L$) or switched off (i.e., the current $i_L$ supplied by the current generator does not flow through the light sources 22, $i_{LED}=0$) with a pulse-width modulation. In the case where the current generator 12 is implemented with an electronic switching converter, switching of the switch $SW_2$ typically occurs with a frequency that is low with respect to the switching frequency of the switching stage of the electronic converter 12. For example, typically, the frequency of the signal $DRV_2$ is between 200 Hz and 2 kHz.

In general, it is also possible to combine the use of amplitude modulation and pulse-width modulation, as described, for example, in the document US 2013/0038234 A1, the contents of which are incorporated herein for reference.

OBJECT AND SUMMARY

The inventors have noted that the use of a shunt switch can create some undesirable effects. For example, the inventors have noted that the light emitted by the light sources can present a continuous variation, i.e., the so-called flicker.

Various embodiments of the present disclosure have the purpose of providing a power-supply circuit that is able to overcome the drawback described previously.

According to various embodiments, the above purpose is achieved thanks to a power-supply circuit having the characteristics recalled in the ensuing claims. The claims also regard a corresponding lighting system and a method for operating a power-supply circuit.

The claims form an integral part of the technical teaching provided herein in relation to the invention.

As mentioned previously, various embodiments of the present disclosure regard a power-supply circuit. The power-supply circuit comprises two output terminals, and a current generator connected to the output terminals and configured to generate a regulated current. In particular, in various embodiments, the current generator comprises a switching stage including one or more electronic switches and one or more inductors. Consequently, the switching stage is configured to supply the regulated current as a function of one or more drive signals that drive switching of the electronic switch or switches. For example, in various embodiments, the switching stage is a buck converter, an isolated buck converter, and/or a bridge buck converter.

In various embodiments, the current generator further comprises a current sensor configured to detect one or more feedback signals representing the regulated current, and a regulation circuit configured to generate the drive signal or signals for the switching stage as a function of the feedback signal or signals.

For example, in various embodiments, the regulation circuit comprises a comparison circuit, in such a way that the regulated current comprises a ripple and the regulated current varies periodically between an upper threshold and a lower threshold; i.e., the regulated current increases during a first interval and decreases during a second interval.

For example, in various embodiments, the comparison circuit may comprise:

two comparators configured to compare the feedback signal or signals with an upper threshold and a lower threshold; or a comparator with hysteresis configured to compare the feedback signal or signals with a reference signal.

Alternatively, the comparison circuit may comprise a single comparator, and the first interval or the second interval may be constant.

Consequently, in various embodiments, the frequency of the ripple is variable, for example, as a function of the output load.

In various embodiments, the power-supply circuit further comprises an electronic shunt switch configured to shortcircuit selectively the output of the current generator, and a control circuit configured to generate a drive signal for opening or closing selectively the electronic shunt switch. For example, in various embodiments, at least one light source is connected to the output of the current generator. Consequently, when the electronic shunt switch is open, the regulated current flows through the light sources, and when the electronic switch is closed, the regulated current flows through the electronic switch. Consequently, the drive signal for the electronic shunt switch may be a pulse-width-modulation signal, and the control circuit can vary the duration of the time interval in which the electronic switch is open as a function of a dimming signal.

In various embodiments, the current generator enables activation or de-activation of generation of the regulated current as a function of an enable signal. In this case, the control circuit can generate the enable signal for the current generator and the drive signal for the electronic shunt switch in such a way as to repeat the following four intervals periodically:

a) after a first time interval, activating the current generator by means of the enable signal;

b) after a subsequent second time interval, opening the electronic shunt switch;

c) after a subsequent third time interval, closing the electronic shunt switch; and d) after a subsequent fourth time interval, de-activating the current generator by means of the enable signal.

In various embodiments, the duration of the second time interval substantially corresponds to the time required for the current supplied by the current generator to reach the upper threshold after an activation of the current generator.

Consequently, thanks to activation and de-activation of the current generator, the ripple in the current supplied by the current generator is synchronised with the drive signal for the electronic shunt switch, thus reducing flicker.

BRIEF DESCRIPTION OF THE ANNEXED REPRESENTATIONS

The invention will now described, purely by way of non-limiting example, with reference to the annexed representations, in which.

DETAILED DESCRIPTION OF EMBODIMENTS

In the ensuing description, various specific details are illustrated aimed at providing an in-depth understanding of the embodiments. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of this description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be adequately combined in one or more embodiments.

The references used herein are provided only for convenience and hence do not define the sphere of protection or the scope of the embodiments.

In the following FIGS. 7 to 10, the parts, elements, or components that have already been described with reference to FIGS. 1 to 6 are designated by the same references used previously in the above figures; the description of these elements described previously will not be repeated hereinafter in order not to overburden the present detailed description.

Figure 1:
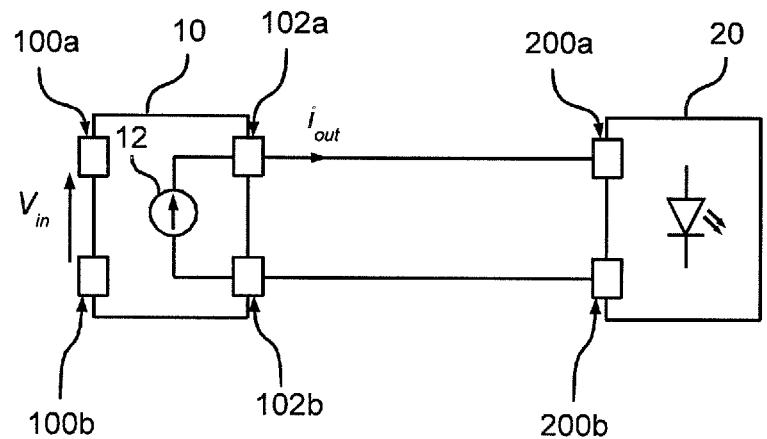
FIG. 1 shows a lighting system comprising a power-supply circuit and a lighting module.
Figure 2:
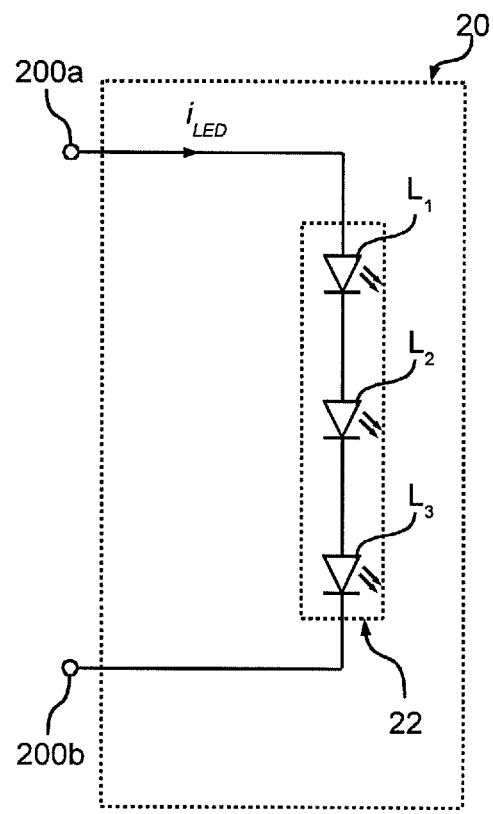
FIG. 2 shows a solid-state lighting module for the lighting system of FIG. 1.
Figure 3:
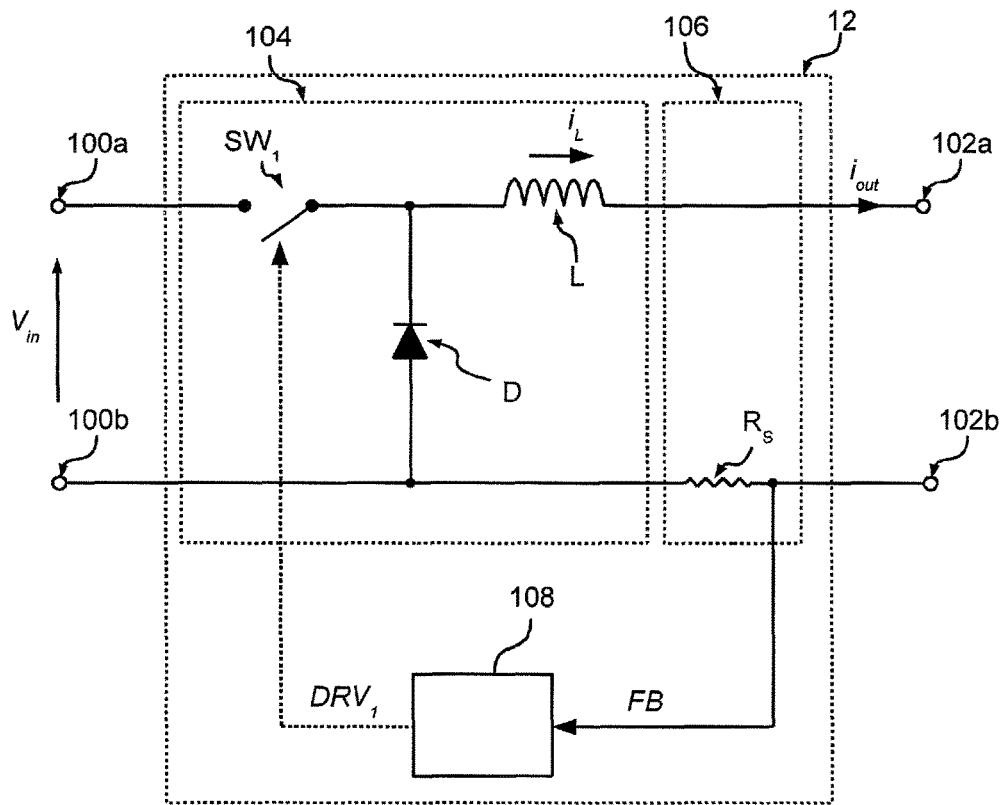
FIG. 3 shows a power-supply switching circuit that can be used as current generator in the lighting system of FIG. 1.
Figure 5:
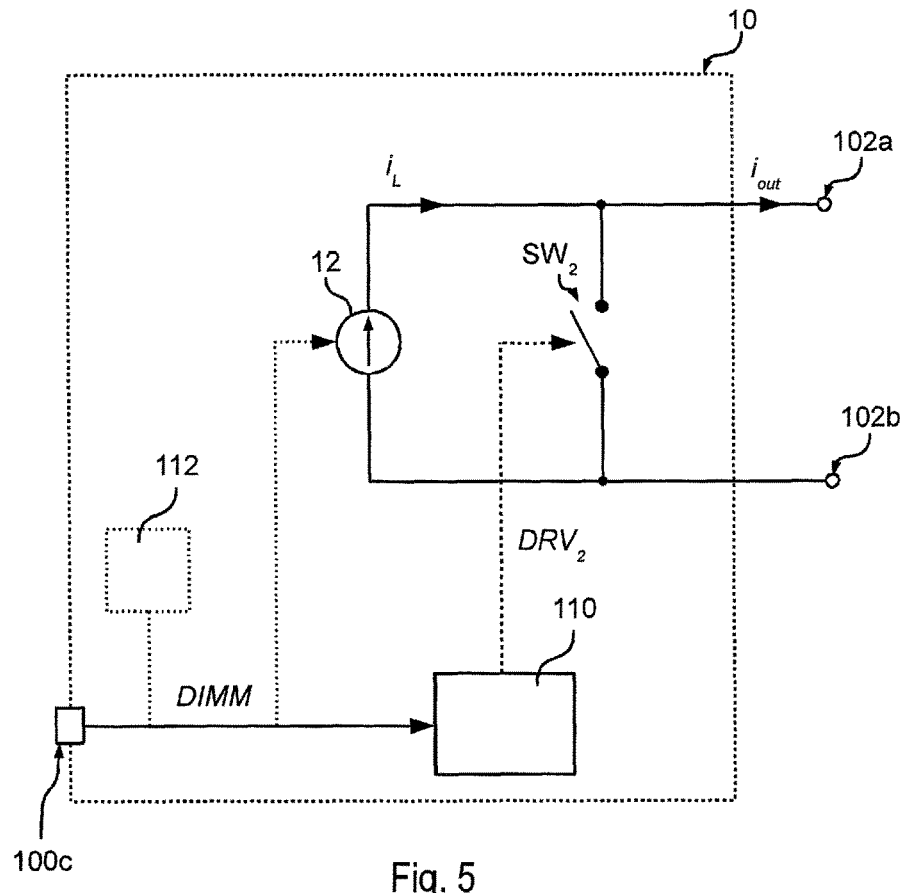
FIG. 5 shows a power-supply circuit with shunt switch.

As described with reference to FIG. 5 (see also the description of FIGS. 1 and 2), for supplying lighting modules 20 comprising solid-state light sources 22, it is possible to use a power-supply circuit 10, which comprises a current generator 12, such as an electronic converter, for example, of the buck type (see also FIG. 3). Moreover, to carry out a dimming operation, the power-supply circuit 10 or the lighting module 20 may comprise an electronic shunt switch $SW_2$ configured to shortcircuit selectively the output of the current generator 12, thus controlling the current flow through the solid-state light sources 22.

In many high-performance applications (for example, for the professional sector) it is required for the dimming precision to be maintained also at low levels of brightness, for example, below 10% and possibly even below 1%. In these systems, the current $i_{LED}$ flowing through the light sources 22 should correspond as far as possible to the theoretical value calculated as the nominal current multiplied by the duty cycle of the drive signal $DRV_2$. For example, this is particularly important for lighting systems, in which the light emitted by light sources 22 with different spectral characteristics (i.e., different colours) is combined in order to generate light with controlled spectral characteristics, i.e., lighting systems with regulation of the colour (and possibly also of the brightness) of the light. Consequently, the precision of the current $i_{out}$ supplied to the light sources 22 should be high to control the aforesaid spectral characteristics.

For example, to obtain a precise duty cycle, the drive signal $DRV_2$ for the switch $SW_2$ can be generated by means of a digital circuit 110, such as a microprocessor programmed via software code or an FPGA (Field-Programmable Gate Array). Consequently, such a digital circuit can generate the drive signal $DRV_2$ starting from a clock signal (which is typically very constant), for example using one or more digital registers/counters or via corresponding software routines.

In the systems described previously, the use of shunt dimming (with the switch $SW_2$) is practically compulsory (possibly combined with an AM dimming), because only in this way can the time $T_{ON2}$ of the current $i_{LED}$ (see also FIG. 6) be controlled precisely. Instead, in low-cost systems, the signal $DRV_2$ could also be used for activating or de-activating directly the current generator 12. However, since the ON and OFF times of the generator 12 cannot be negligible, the dimming curve has a marked not-linearity, in particular at low levels of brightness.

However, the inventors have noted that, using the technique of shunt dimming with an electronic switching converter as current generator 12, the light emitted by the light sources 22 may present an undesirable flicker, above all at low levels of brightness. This flicker may be visible, for example, when a scene lit by means of the light sources 22 is to be filmed with a high-speed video camera.

Figure 4:
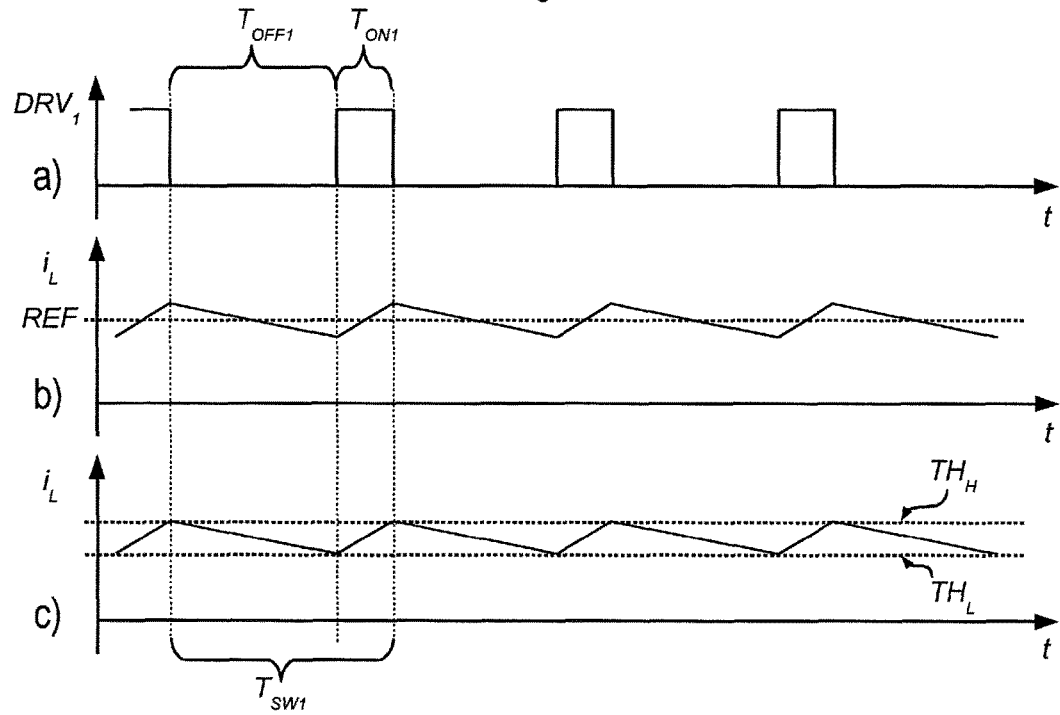
FIG. 4 shows some waveforms of the signals of the current generator of FIG. 3.
Figure 6:
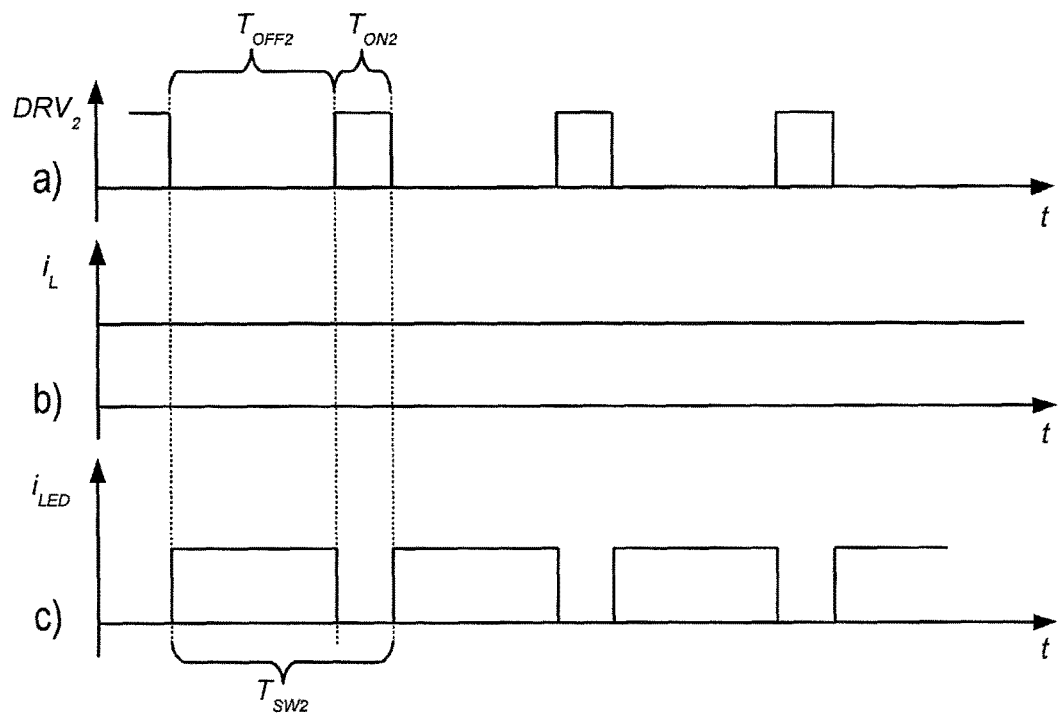
FIG. 6 shows some waveforms of the signals of the power-supply circuit of FIG. 5.
Figure 7:
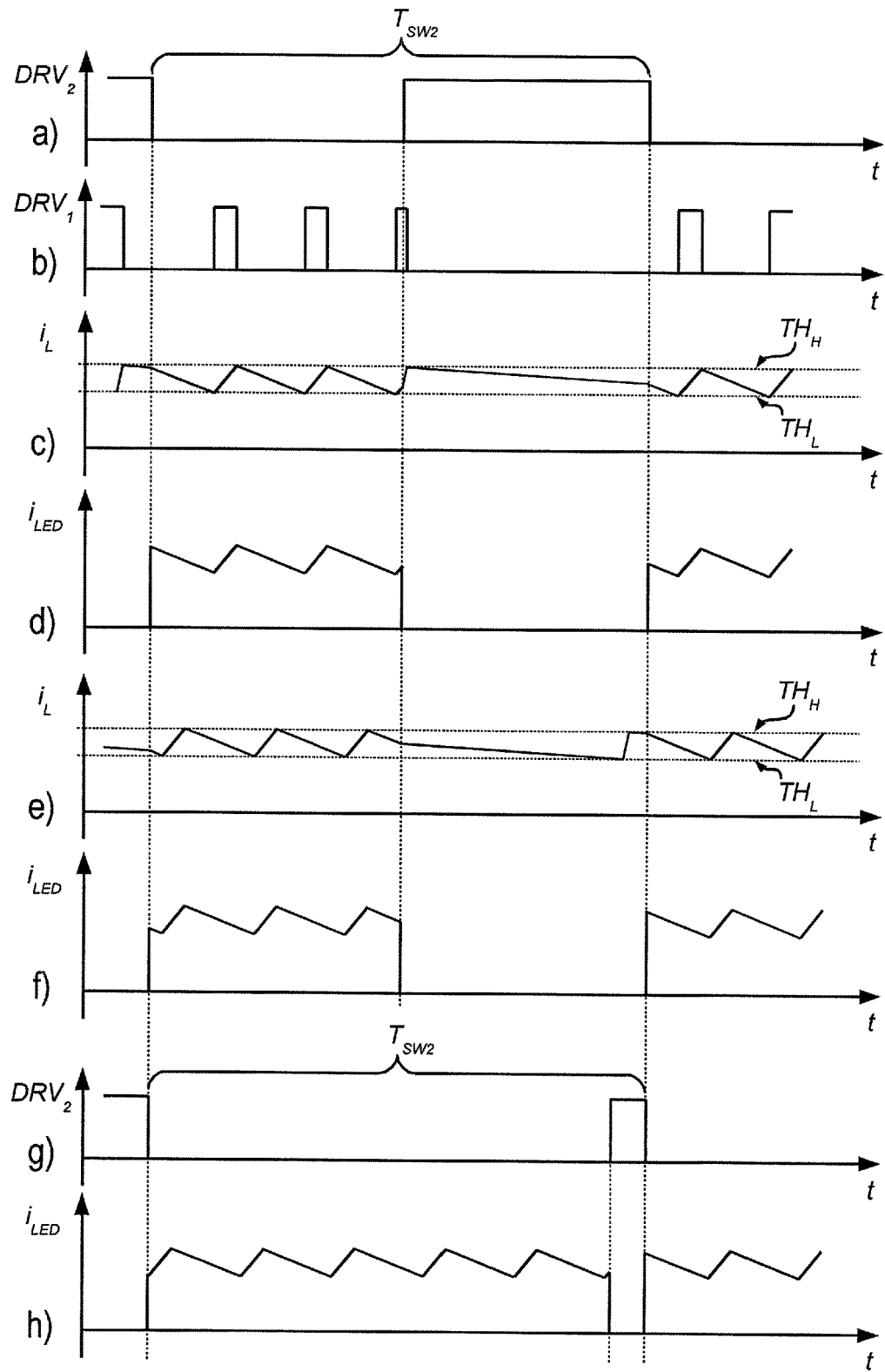
FIG. 7 shows details of the signals of the power-supply circuit of FIG. 5.

In particular, the inventors have noted that the aforesaid flicker is generated because the current $i_L$ supplied by the current generator 12 is not constant (as shown in FIG. 6) but has in actual fact a high-frequency ripple (see FIG. 4). In particular, in the architecture shown in FIG. 5, the lighting system does not comprise a (large) output capacitor connected between the terminals 102a and 102b (or the terminals 200a and 200b of the lighting module). Consequently, when the switch $SW_2$ is open, the current generated by the current generator 12 flows entirely through the light sources 22. For example, with a buck converter (see FIG. 3), the current $i_{LED}$ flowing through the light sources 22 corresponds in this case to the current $i_L$ flowing through the inductor L. However, this current will have a ripple intrinsically due to switching of the switching stage 104 of the electronic converter. Consequently, for each pulse of the drive signal $DRV_2$, the profile of the current $i_{out}$ will be slightly different, this also affecting the intensity of the light emitted by the light sources 22.

In principle, the above flicker could hence be removed by synchronizing operation of the control circuit 110 with operation of the regulation circuit 108.

For example, this is possible in the case where the control circuit 104 of the electronic converter comprises a PI/PID regulator 104 configured to generate one or more PWM signals. In fact, whereas the ON times $T_{ON}$ and OFF time $T_{OFF1}$ of the signal $DRV_1$ are variable in this type of control, the duration of the switching interval $T_{SW1}$ remains constant.

However, the above synchronization is much more complex in the case where a control with hysteresis is used. For example, as explained with reference to FIG. 3, the control circuit 110 could comprise a comparison circuit, including:
 two comparators configured to compare the current $i_L$ generated by the switching stage 104 of the electronic converter 10 with an upper threshold $TH_H$ and a lower threshold $TH_L$; or
 a single comparator with hysteresis configured to compare the current $i_L$ generated by the switching stage 104 of the electronic converter 10 with a single threshold, which corresponds, for example, to the threshold REF shown in FIG. 4b.

Likewise, even just one comparator could be used, in which:
 the comparator opens the switch $SW_1$ when the current $i_L$ generated by the switching stage of the electronic converter 10 reaches an upper threshold $TH_H$, and the switch $SW_1$ is closed again after a constant OFF time $T_{OFF1}$; or
 the comparator closes the switch $SW_1$ when the current $i_L$ generated by the switching stage of the electronic converter 10 reaches a lower threshold $TH_L$, and the switch $SW_1$ is opened again after a constant ON time $T_{ON}$.

In fact, in all these cases in which a substantially self-oscillating topology is used, the duration of the switching interval $T_{SW1}=T_{ON}+T_{OFF1}$ is variable, for example, as a function of the output load, the variation of the input voltage $V_{in}$, the output voltage (which substantially corresponds to the forward voltage of the solid-state light sources 22, which in turn depends upon the number of the solid-state light sources 22 and the temperature of the solid-state light sources 22), etc. Consequently, the signals $DRV_1$ and $DRV_2$ are difficult to synchronize.

For instance, FIG. 7a shows an example of the drive signal $DRV_2$, FIG. 7b shows an example of the drive signal $DRV_1$, and FIG. 7c shows the respective current $i_L$ that, following upon a control with hysteresis varies between a lower threshold $TH_L$ and an upper threshold $TH_H$; namely, the current $i_L$ has a ripple that varies between an upper threshold $TH_H$ and a lower threshold $TH_L$. For example, this ripple can have an amplitude of 20% of the mean value of the current $i_L$. Finally, FIG. 7d shows the resulting current $i_{LED}$ flowing through the light sources 22.

In particular, when the switch $SW_2$ is closed (for example, the drive signal $DRV_2$ is high), the light sources 22 are disconnected, and the current generator 12 is shorted. Consequently, typically, the rise time of the current $i_L$ (which in a buck converter corresponds to the duration $T_{ON}$) is short and the fall time of the current $i_L$ (which in a buck converter corresponds to the duration $T_{OFF1}$) is long. Instead, when the switch $SW_2$ opens (for example, the drive signal $DRV_2$ becomes low), the light sources 22 are connected to the output of the current generator 12, thus changing the load of the current generator 12. Hence, typically, the rise time of the current $i_L$ ($T_{ON}$ in a buck converter) increases, and the fall time of the current $i_L$ ($T_{OFF1}$ in a buck converter) decreases. As explained previously, one of these times could also be predetermined and possibly constant. The figures are hence provided only by way of illustration and do not define the proportion between the switching times $T_{SW1}$ and $T_{SW2}$. For example, in a buck converter, the switching frequency of the drive signal $DRV_1$ may even reach some megahertz; for example, this frequency (which is variable, due to the controller with hysteresis) may be around 800 kHz. In this case, also the frequency of the drive signal $DRV_2$ may be higher, for example between 2 and 5 kHz. For instance, in various embodiments, the proportion between the switching times $T_{SW2}$ and $T_{SW1}$ is chosen between 50 and 500, for example between 200 and 400. In general, these proportions apply to the periods in which the light sources 22 are supplied, since (as explained before) the switching time $T_{SW1}$ increases when the load is shorted.

Consequently, in general, the switching cycle $T_{SW1}$ is not repeatable and depends also upon the characteristics of the load. For example, FIGS. 7e and 7f show waveforms for the currents $i_L$ and $i_{LED}$, in which only the instant in which they have been captured has changed.

For this reason, albeit using the same drive signal $DRV_2$, the current $i_L$ supplied to the light sources 22 can be activated and de-activated at different values of the current $i_L$, thus introducing a variability in the current waveform, which can result in a variability of mean current supplied to the light sources 22. This variability hence results in an error for each switching cycle $T_{SW2}$, which not only changes for different loads, but also between consecutive cycles with one and the same load.

In general, the maximum error of the mean current for each cycle of the drive signal $DRV_2$ with respect to a required value depends upon the amplitude of the ripple of the current $i_L$ supplied by the current generator 12. For instance, for an ideal current generator, this error would be zero (as shown in FIG. 6). Instead, for a real electronic converter, this error will depend upon the hysteresis of the regulation circuit 108, i.e., the thresholds $TH_H$ and $TH_L$.

A possible solution for reducing the effect of the above problem could hence be a reduction of the ripple in the current $i_L$ supplied by the current generator 12. However, this typically requires the use of a larger inductor L or additional filters, which, however, increase the cost, size, and electrical losses of the current generator 12. Alternatively, in a hysteretic system with thresholds $TH_H$ and $TH_L$, it could be possible to reduce the difference between the aforesaid thresholds in order to reduce the ripple, but this method clashes against the constructional difficulties of accurately distinguishing crossing of the threshold.

Moreover, the effect of the error introduced will also depend upon the duty cycle of the drive signal $DRV_2$. In fact, as shown in FIGS. 7g and 7h, by increasing the time during which the switch $SW_2$ is open (high brightness), the number of ripples (with mean value of the current substantially constant) increases and the effect of truncation of the ripple at different instants becomes less important. Vice versa, as shown in FIGS. 7a to 7f, by reducing the time in which the switch $SW_2$ is opened (low brightness) the number of ripples decreases and the effect of truncation becomes increasingly more important.

This effect could hence also be reduced by increasing the switching frequency of the switching stage 104a of the electronic converter, thus increasing the number of ripples with substantially constant mean value, proportionally reducing the effect of truncation of the ripples at different instants. However, apart from the problems of regulation, also from the standpoint of electromagnetic emissions, the switching frequency should not be excessively high.

Consequently, as described previously, it would be expedient to provide a mechanism that enables synchronization of the signals $DRV_1$ and $DRV_2$ also in the case where the period $T_{SW1}$ is variable.

For this purpose, the control circuit 110 could hence monitor the drive signal $DRV_1$ and synchronize opening of the switch $SW_2$ with the rising or falling edge of the drive signal $DRV_1$.

Figure 8:
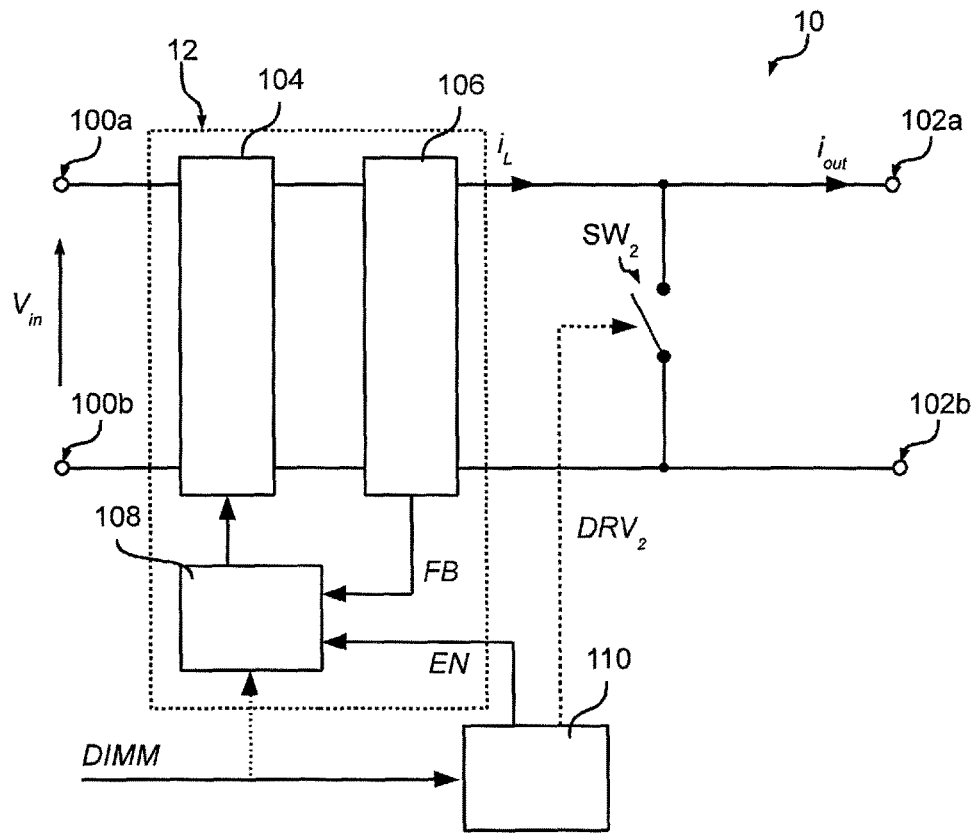
FIG. 8 shows an embodiment of a power-supply circuit according to the present disclosure.

Instead, FIG. 8 shows an embodiment in which the synchronization is implemented in an indirect way. However, this embodiment presents the advantage that no additional components are required, thus rendering this solution simpler.

As explained previously, the current generator 12 of the power-supply circuit 10 typically comprises:
- a switching stage 104 (for example, the components $SW_1$, L, and D of a buck converter) configured to supply a current $i_L$ as a function of one or more drive signals (for example, the drive signal $DRV_1$);
- a current sensor 106 configured to detect a feedback signal FB representing the current $i_L$ supplied by the switching stage 104 (for example, the resistor $R_S$); and
- a regulation circuit 108 configured to generate the drive signal or signals for driving the switching stage 104 as a function of the feedback signal FB and one or more reference signals/thresholds (for example, REF, or $TH_H$ and $TH_L$).

In particular, in the embodiment considered, the regulation circuit 108 is configured to activate or de-activate generation of the current $i_L$ as a function of an enable signal EN; i.e., the current generator 12 can be activated or de-activated as a function of the enable signal EN. Many known regulation circuits 108, for example in the form of an integrated circuit, already comprise an input of this sort, for example for switching off selectively the switching stage 104, for instance, when malfunctioning is detected. Moreover, in the embodiment considered, the control circuit 110 is configured to generate the enable signal EN for activating and de-activating selectively the current generator 12.

For example, considering a buck converter, the regulation circuit 108 could:

a) when the signal EN indicates that the current generator 12 should be de-activated (for example, when the signal EN is low), keep the switch $SW_2$ open (for example, by setting the drive signal $DRV_1$ to the low level); and b) when the signal EN indicates that the current generator 12 should be activated (for example, when the signal EN is high), generate the drive signal $DRV_1$ as described previously.

In particular, as shown in FIG. 9a, in various embodiments, the control circuit 110 generates, as described previously, a PWM drive signal $DRV_2$, in such a way as to:

a) open the electronic switch $SW_2$ during a first interval $T_{OFF2}$ (for example, by setting the signal $DRV_2$ to the low level) in such a way that the current $i_L$ generated by the current generator 12 is supplied through the terminals 102a and 102b, i.e., flows through the light sources 22; and b) close the electronic switch $SW_2$ during a second interval $T_{ON2}$ (for example, by setting the signal $DRV_2$ to the high level) in such a way that the output of the current generator 12 is shorted, i.e., the current $i_L$ generated by the current generator 12 does not flow through the light sources 22.

In particular, these intervals are repeated periodically with a fixed frequency (i.e., the switching period $T_{SW2}=T_{ON2}$ $T_{OFF2}$ is constant), whereas the duty cycle can vary as a function of a dimming signal DIMM.

However, as shown in FIG. 9b, the control circuit 110 also generates the enable signal EN that corresponds to a PWM signal in such a way as to:

a) activate the current generator 12 (for example, by setting the signal EN to the high level) for a time $T_{on}$ prior to start of the interval $T_{OFF2}$; and b) de-activating the current generator 12 (for example, by setting the signal EN to the low level) for a time $T_{off}$ after the end of the interval $T_{OFF2}$.

Consequently, also the signal EN is a PWM signal with a switching period $T_{SWEN}$ that corresponds to the switching period $T_{SW2}$ of the drive signal $DRV_2$. However (apart from the fact that the signals can be reversed, which only depends upon the logic levels used), the signals have different duty cycles, because the enable signal EN activates the current generator 12 for a duration $T_{EN}=T_{on}+T_{OFF2}+T_{off}$ and the current generator 12 remains de-activated for a duration $T_{DIS}=T_{SWEN}-T_{EN}$.

Consequently, the current generator 12 is enabled only when also the light sources 22 are to be supplied, and the intervals $T_{on}$ and $T_{off}$ are provided for enabling a correct activation and de-activation of the current $i_L$.

Consequently, switching-off and switching-on of the current generator 12 substantially corresponds to a reset in which the current generator 12 is brought into a known condition. Consequently, in the case where the time $T_{on}$ is constant, opening of the electronic switch $SW_2$ via the drive signal $DRV_2$ will always be in the same position with respect to the drive signal $DRV_1$; i.e., the electronic switch $SW_2$ is always opened with the same value of the current $i_L$; namely, the initial value of the current $i_{LED}$ flowing through the light sources 22 is constant.

Instead, closing of the electronic switch $SW_2$ occurs after the interval $T_{OFF2}$, and the value of the current $i_L$ at this instant may be variable on the basis of the current characteristics of the load. However, these variations are normally at a lower frequency and hence negligible.

In addition, switching-off of the current generator 12 also enables reduction of the electrical losses of the power-supply circuit 10.

As mentioned previously, the time $T_{on}$ is preferably constant and should be chosen in such a way as to enable proper operation of the current generator 12. However, the time $T_{on}$ should not be excessively long, since otherwise the variation of the durations of the ripples in the current $i_L$ can again create a variable phase shift between the signals. Consequently, as shown in FIG. 9d, preferably the time $T_{on}$ is chosen in such a way that opening of the electronic switch $SW_2$ via the drive signal $DRV_2$ occurs a little after the instant in which the current $i_L$ reaches the upper threshold $TH_H$ for the first time after activation of the current generator 12 by means of the enable signal EN.

For example, hereinafter a buck converter will again be considered to explain a possible choice of the time $T_{on}$.

In particular, when the current generator is activated, no current is supplied to the light source, since the switch $SW_2$ is closed. For this reason, the voltage $V_L$ on the inductor L substantially corresponds to the input voltage $V_{in}$, because the output 102a/102b is shorted and also the switch $SW_1$ is closed.

Consequently, the current $i_L$ flowing through the inductor L increases linearly. In particular, at low duty cycles of the drive signal $DRV_2$ (i.e., when the flicker could be visible), the current $i_L$ is initially equal to zero, and the current hence increases as expressed by the following equation:

$$i_L(t) = \frac{1}{L}\int_0^\tau V_L d\tau = \frac{1}{L}\int_0^\tau V_{in} d\tau = \frac{1}{L} V_{in} \cdot t \quad (1)$$

Consequently, the value of $T_{on}$ can be calculated by applying the following equation:

$$T_{on} = \frac{TH_H \cdot L}{V_{in}} \quad (2)$$

namely, the time $T_{on}$ corresponds to the time required for the current supplied by the current generator 12 to reach the upper threshold $TH_H$ with the input voltage $V_{in}$. Specifically, this time required is the maximum required value (i.e., starting from an initial current $i_L=0$) when the output of the current generator 12 is shorted.

In general, this value is the preferable one, and it is in any case acceptable for the time $T_{on}$ to be chosen in such a way that the switch $SW_2$ is opened within the first switching cycle of the converter or ripple in the current $i_L$ (preferably within half of the first switching cycle). Instead, the time should not be decreased by the value indicated by Eq. (2) (for example below 50%), since in this case the time required for complete activation of the current generator again affects the precision of the dimming operation with respect to the theoretical value (nominal current multiplied by the duty cycle). For example, by setting the time $T_{on}$ to zero, the precision would be that of a traditional operation without shunt switch, in which only the current generator 12 is activated or de-activated directly with the signal $DRV_2$.

Consequently, in various embodiments, the time $T_{on}$ is chosen between 50% of the time required for reaching the upper threshold $TH_H$ with the input voltage $V_{in}$ (from a zero initial current) and 50% of the duration $T_{SW1}$ (in the condition when the terminals 102a and 102b are shorted). For example, in various embodiments, the time $T_{on}$ is chosen between 0.8 and 1.5 of the time required to reach the upper threshold $TH_H$ of the input voltage $V_{in}$. This relation applies also to other converters, and for a buck converter Eq. (2) can be used.

Assuming that the values for L and $TH_H$ are constant, the value of the time $T_{on}$ will hence only depend upon the input voltage $V_{in}$ and not upon the characteristics of the load. In this regard, FIG. 9e shows the current $i_{LED}$ corresponding to the current $i_L$ represented in FIG. 9d, and FIG. 9f shows the current $i_{LED}$ for a lower load and a higher duty cycle. In both cases, the switch $SW_2$ opens (and hence the current $i_{LED}$ is activated and corresponds to the current $i_L$ supplied by the current generator 12) at the same initial value for the current $i_L$, whereas the number of ripples and the final value for the current $i_L$ may be different. However, these parameters typically vary more slowly and hence do not create a visible flicker.

Since the voltage $V_{in}$ is typically constant, also the time $T_{on}$ can be predetermined and remain constant. However, in general (for example, in the case where also an AM dimming is used and/or the input voltage $V_{in}$ is variable), the control circuit 110 could also detect the value of the threshold $TH_H$ and/or of the input voltage $V_{in}$ and calculate the value of the time $T_{on}$ periodically, for example for each switching cycle.

In general, the time $T_{off}$ is less important. For instance, in various embodiments, also this value is constant and/or in the region of the duration $T_{on}$, for example $T_{off}=T_{on}$.

Consequently, thanks to the reset of the current generator 12, opening of the switch $SW_2$ by means of the drive signal $DRV_2$ is synchronised with switching of operation of the current generator 12, thus reducing flicker. In fact, each switching cycle will start substantially from the same situation, thus reducing the variation of the current $i_{LED}$ supplied to the light sources 22. Even though the effect can be observed above all with low duty cycles, the waveforms improve also with high duty cycles, where impact of the variations on the mean brightness is substantially negligible.

Moreover, also the error introduced with respect to the theoretical value is reduced, this being particularly useful for lighting systems with colour control.

Finally, as secondary but non-negligible effect, the energy consumption is reduced, since the current generator 12 only works when also the light sources 22 are to be supplied.

The person skilled in the branch will appreciate that the same solution can be applied also to other types of switching current generators that have a similar behaviour in the output current, such as buck converters of some other type, for example of a bridge or isolated type.

Likewise, the light sources may also be of other types, such as LEDs or laser diodes that emit infrared or ultraviolet light.

Figure 10:
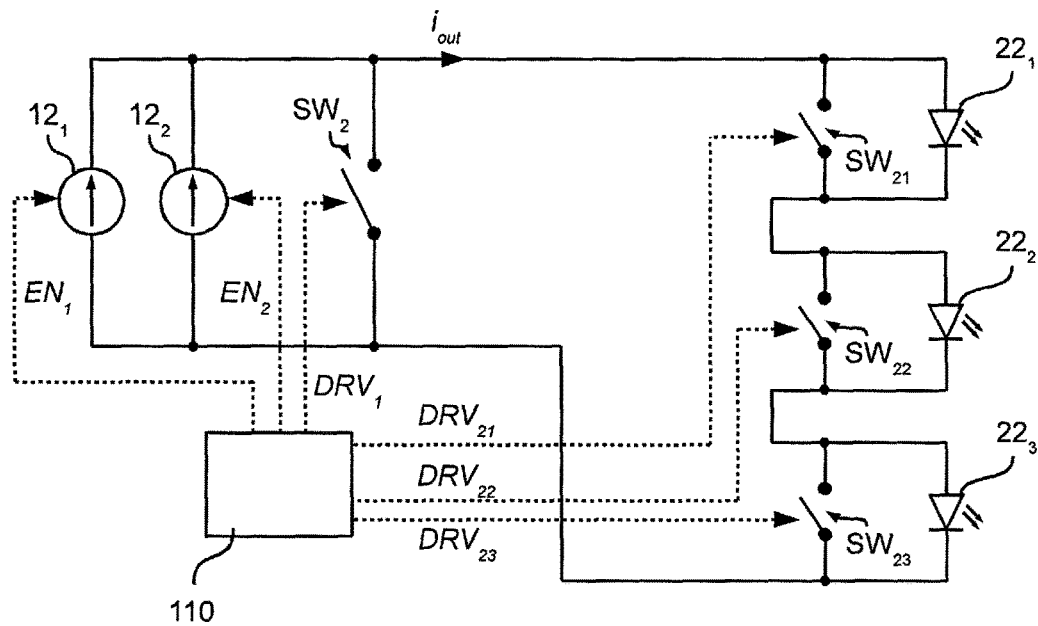
FIG. 10 shows a further embodiment of a power-supply circuit according to the present disclosure.
Figure 9:
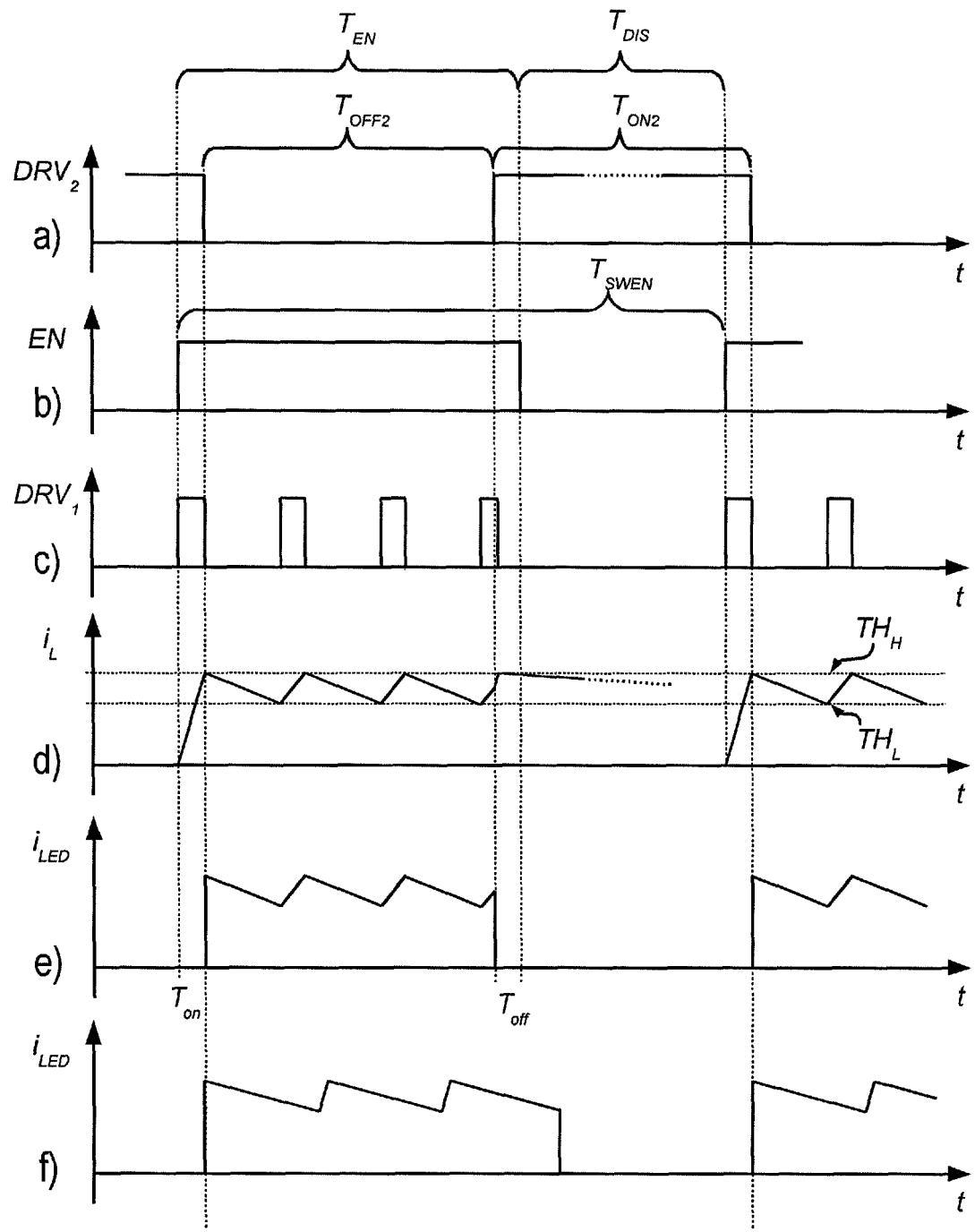
FIG. 9 shows some waveforms of the signals of the power-supply circuit of FIG. 8.

Moreover, as shown in FIG. 10, the solution described previously can be applied also to more complex lighting systems comprising:

- a plurality of current generators 12 connected in parallel, for example two current generators $12_1$ and $12_2$, which can be activated and de-activated individually, for example, via two signals $EN_1$ and $EN_2$; and/or
- a plurality of light sources 22, for example, three light sources $22_1$, $22_2$ and $22_3$, which can be shorted individually via respective electronic switches, for example three switches $SW_{21}$, $SW_{22}$, and $SW_{23}$, driven with respective drive signals, for example, signals $DRV_{21}$, $DRV_{22}$, and $DRV_{23}$.

Consequently, in various embodiments, a plurality of current generators 12 can supply one and the same load. These current generators 12 (which can supply also different currents) can be used for choosing the amplitude of the current supplied to the light sources 22, activating different sets of the aforesaid current generators 12.

For example, the above solution can be used for supplying one and the same light source with the same mean current, but varying the amplitude of the current and the duty cycle of shunt dimming, which affects the colour of the light emitted by the solid-state light sources. For example, the stop light of a vehicle could be driven with this mechanism in such a way as to change slightly colour in the case of emergency.

Moreover, the combination of a plurality of current generators 12 can be used to generate a current with greater amplitude, which may be useful for video projectors that require a high brightness.

Instead, a plurality of light sources 22 can be used for implementing systems with regulation of the colour of light. For example, in this case, each light source $22_1$, $22_2$, and $22_3$ could emit light with a different colour, as occurs, for example, in RGB systems. In this case, the light sources 22 are supplied separately (substantially using the circuits described previously) or the light sources 22 are connected in series to one or more current generators 12, and each light source 22 has associated a respective switch $SW_{21}$, $SW_{22}$, and $SW_{23}$, for shorting selectively the respective light sources 22, in such a way as to regulate individually the brightness of the respective light sources 22. Consequently, in this case, the switches $SW_{21}$, $SW_{22}$, and $SW_{23}$ can also be used for implementing the switch $SW_2$ directly connected to the output of the current generator or generators 12.

Consequently, in various embodiments, the signals for controlling operation of the lighting system can all be generated by one and the same control circuit 110. In particular, the control circuit 110 can generate the enable signal or signals to activate and de-activate the current generator or generators 12, and at least one between:

- the drive signal for driving the electronic switch $SW_2$ connected (for example, directly) in parallel to the output of the current generator or generators 12, and/or
- the drive signal or signals for driving the switches connected (for example, directly) in parallel to one or more light sources 22.

In particular, also in this case, the enable signal or signals for the current generator or generators 12 are synchronised with the drive signal or signals for the switches, in such a way as to de-activate the current generator or generators 12 when no current is supplied to the light source or sources 22.

For example, considering a current generator that supplies a nominal current of 1 A to four light sources 22 that have a forward voltage of 3 V (such as white LEDs), the maximum output power absorbed is 12 W. Considering also the electrical losses (typically the efficiency of an electronic converter is around 90%), the power consumption is approximately 13 W.

Also in this case, to switch off the light sources individually, each light source 22 can have associated a respective shunt switch for shorting the light source 22 ($SW_{21}$, $SW_{22}$, etc.). Consequently, when the four switches are closed and assuming that each switch has a closing resistance of 0.1Ω, the output power drops to 0.4 W (since the switches are connected in series and the overall closing resistance is 0.4Ω) and the consumption of the system drops to approximately 0.5 W (assuming an efficiency of the electronic converter of 80% with this load). Consequently, this consumption represents only 4% of the consumption when the system emits light. However, thanks to de-activation of the current generator or generators 12 also these losses can be practically reduced to zero.

In general, the solution can be used also in lighting systems in which data are transmitted by modulating the light supplied by the light sources, for example, a Li-Fi system. In fact, with the solution described, short current pulses can be obtained, which have a high repeatability between one pulse and another, this hence enabling reduction of possible reception errors.

Of course, without prejudice to the principle of the invention, the details of construction and the embodiments may vary, even significantly, with respect to what has been described and illustrated herein purely by way of non-limiting example, without thereby departing from the scope of the present invention, as defined by the ensuing claims.

LIST OF REFERENCE SIGNS

Electronic converter 10
Current generator 12, $12_1$, $12_2$
Input terminal 100a, 100b, 100c
Output terminal 102a, 102b
Switching stage 104
Current sensor 106
Regulation circuit 108
Control circuit 110
Sensor 112
Lighting module 20
Input terminal 200a, 200b
LED string 22, $22_1$, $22_2$, $22_3$
Diode D
Inductor L
LED $L_1$, $L_2$, $L_3$
Resistor $R_S$
Electronic switch $SW_1$, $SW_2$, $SW_{21}$, $SW_{22}$, $SW_{23}$
Dimming signal DIMM
Drive signal $DRV_1$, $DRV_2$, $DRV_{21}$, $DRV_{22}$, $DRV_{23}$
Enable signal EN, $EN_1$, $EN_2$
Feedback signal FB
Output current $i_{out}$ Current flowing through the inductor L $i_L$
Current flowing through the LEDs $i_{LED}$
Reference value REF
De-activation time $T_{DIS}$
Activation time $T_{EN}$
Upper threshold $TH_H$
Lower threshold $TH_L$
Time $T_{on}$, $T_{off}$
ON time $T_{ON}$, $T_{ON2}$
OFF time $T_{OFF1}$, $T_{OFF2}$
Duration of the switching interval $T_{SW1}$, $T_{SW2}$
Switching period $T_{SWEN}$
Input voltage $V_{in}$

The invention claimed is:

1. A power supply circuit comprising:
   two output terminals for providing a current;
   a current generator configured to generate a regulated current, wherein said current generator comprises:
      a switching stage comprising one or more first electronic switches and one or more inductors, said switching stage being configured to provide said regulated current as a function of one or more drive signals,
      a current sensor configured to detect at least one feedback signal indicative of said regulated current provided by said switching stage, and
      a regulator circuit configured to generate said one or more drive signals for said switching stage as a function of said at least one feedback signal; wherein the regulator circuit comprises a comparison circuit such that the regulated current comprises a ripple and the regulated current varies periodically between an upper threshold and a lower threshold;
   a second electronic switch configured to selectively short circuit the output of said current generator as a function of a further drive signal; and
   a control circuit configured to generate said further drive signal for opening or closing selectively the second electronic switch;
   wherein said current generator is configured to activate or deactivate the generation of said regulated current as a function of an enable signal, and said control circuit is configured to generate said enable signal and said further drive signal, in order to repeat periodically the following steps:
      after a first time-interval, activating said current generator;
      after a second time-interval, opening the second electronic switch, wherein the duration of the second time interval ranges from 0.8 to 1.5× of the time required until the regulated current reaches the upper threshold after an activation of the current generator;
      after a third time-interval, closing the second electronic switch, and
      after a fourth time-interval, deactivate said current generator.

2. The power supply circuit according to claim 1, wherein said further drive signal is a pulse width modulated signal, and wherein said control circuit is configured to vary said third time interval wherein the second electronic switch is opened as a function of a dimming signal.

3. The power supply circuit according to claim 1, wherein said comparison circuit comprises:
   two comparators configured to compare said at least one feedback signal with said upper threshold and said lower threshold; or
   a comparator with hysteresis configured to compare said at least one feedback signal with a reference signal.

4. The power supply circuit according to claim 1, wherein the frequency of said ripple is variable.

5. Power supply circuit according to claim 1, wherein said switching stage is a buck, isolated buck and/or bridge buck converter.

6. A lighting system comprising a power supply circuit according to claim 1 and further comprising at least one lighting source connected to the output terminals of said current generator, wherein:
   when the second electronic switch is opened, said regulated current flows through said at least one light source, and
   when the second electronic switch is closed, said regulated current flows through the second electronic switch.

7. The lighting system according to claim 6, wherein said light source is a solid state light source, such as a LED.

8. The power supply circuit according to claim 1, wherein the current sensor is arranged between the switching stage and the output of the current generator.

* * * * *